[11] 3,596,262

[72] Inventors William L. Rollwitz;
Harvey S. Benson, both of San Antonio, Tex.
[21] Appl. No. 696,370
[22] Filed Jan. 8, 1968
[45] Patented July 27, 1971
[73] Assignee Southwest Research Institute
San Antonio, Tex.

[54] TELEMETRY MEASURING APPARATUS
10 Claims, 7 Drawing Figs.
[52] U.S. Cl. .................................................. 340/200,
73/362, 310/14, 340/210
[51] Int. Cl. ............................................... G08c 19/10,
G08c 19/38
[50] Field of Search ................................. 73/346,
351, 362, 362 CP; 340/200, 210

[56] References Cited
UNITED STATES PATENTS
3,260,116 7/1966 Grady ........................... 340/210
3,480,808 11/1969 Rieth ............................. 340/210
3,487,398 12/1969 Rieth ............................. 340/210

*Primary Examiner*—Thomas B. Habecker
*Attorneys*—James F. Weiler, Jefferson D. Giller, William A. Stout, Paul L. DeVerter, II, Dudley R. Dobie, Jr. and Henry W. Hope ABSTRACT: An electrical measuring and telemetry apparatus for monitoring physical conditions of objects. A magnetic power generator having parts movable in response to the motion of an object to generate electrical power and in which the condition of the object such as temperature, stress, strain or pressure is measured by an electrical transducer to vary the signal output from a transmitter which receives the generated power and transmits electrical signals in response to the condition being measured. A temperature measuring apparatus having a power source, an electrical transmitter having a tank circuit for transmitting electrical signals whose frequency is controlled by the tank circuit, and a temperature sensitive capacitor positioned adjacent the object and electrically connected in the tank circuit thereby varying the transmitted signals in proportion to the temperature of the object. A power generator having a coil and magnet movable relative to each other to generate electrical power in response to the motion of the object. A power generator having first and second members one of which is fixed and the second of which moves relative to the fixed member, the first member being a circular toothed disc and the second member including two soft iron pieces having a pickup coil wound thereon and a permanent magnet positioned between the soft iron pieces whereby a voltage is generated in the coil when the coil moves relative to the toothed disc. A magnetic power generator for providing a power source in response to rotating, oscillating, or reciprocating movement of an object.

William L. Rollwitz
Harvey S. Benson
INVENTORS

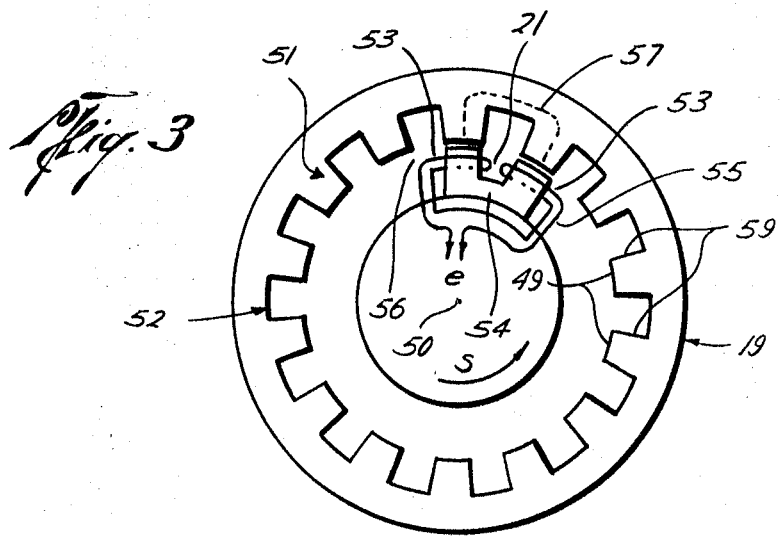
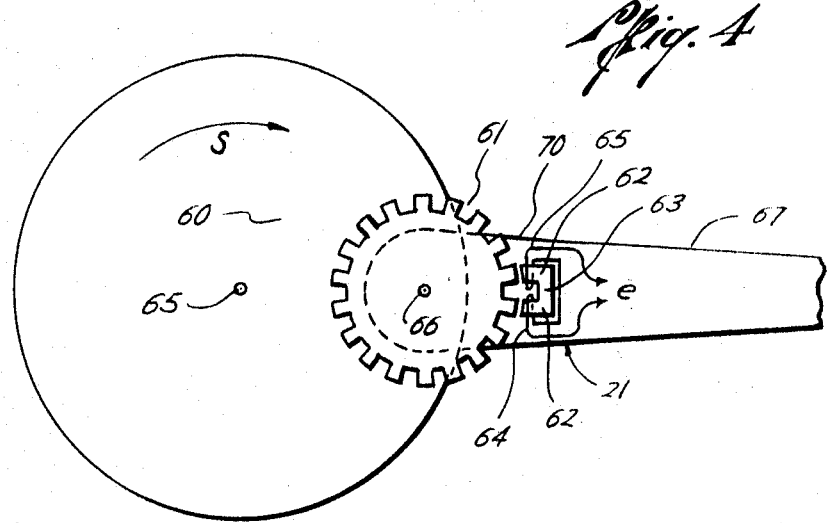
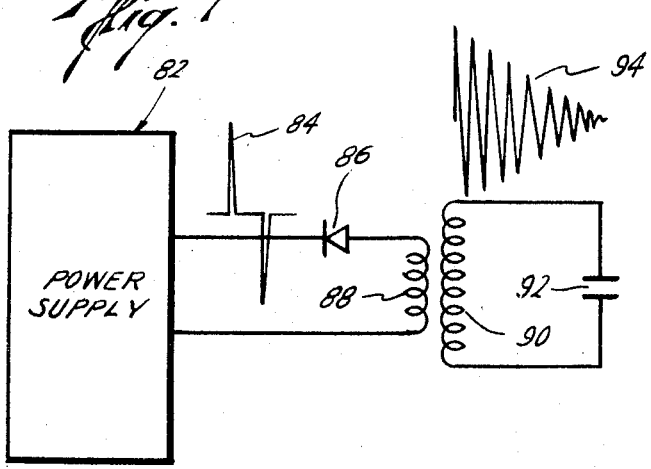

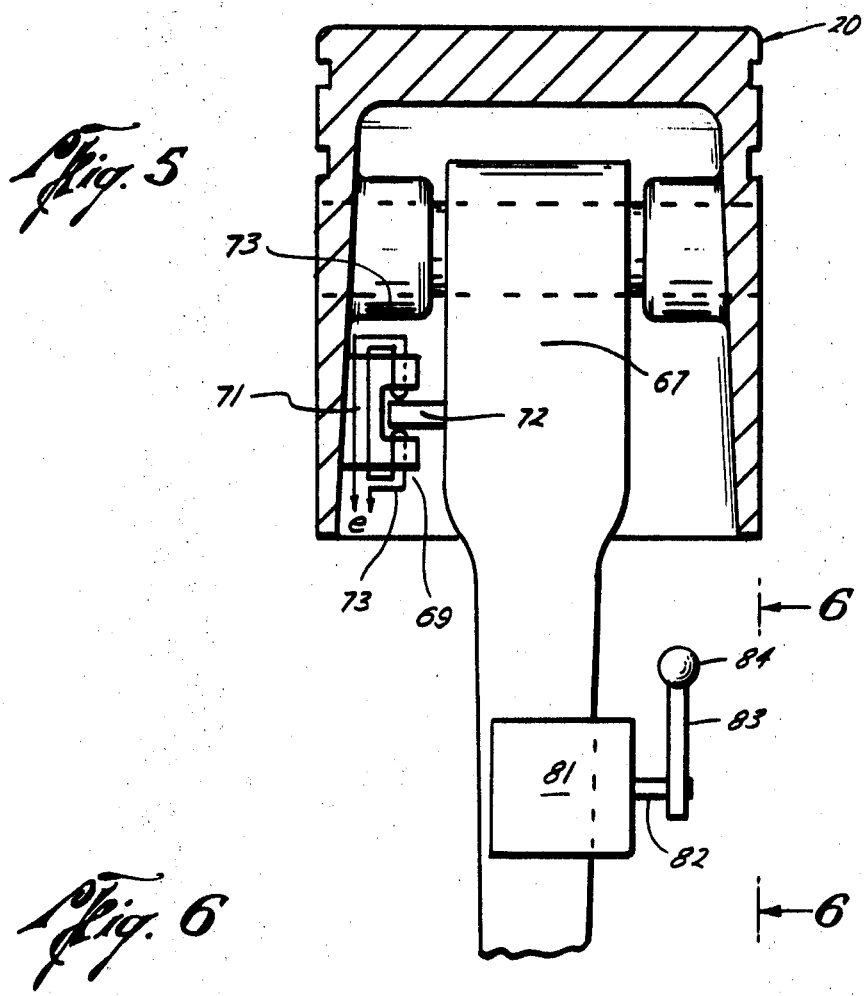

3,596,262

1

TELEMETRY MEASURING APPARATUS

BACKGROUND OF THE INVENTION

Generally, it has been difficult to measure various physical conditions of objects in certain environments. For instance, the measurement of temperature, stress, strain, and pressures of moving parts of machinery such as internal combustion engines has been limited because of the high temperatures and severe shock load conditions. And for example, in an entirely different environment, it has been difficult in the past to measure internal small temperature changes in humans and animals.

SUMMARY

The present invention is directed to providing a telemetry measuring apparatus for monitoring physical conditions of an object under difficult environmental conditions.

One object of the present invention is to provide a temperature telemetry measuring apparatus for measuring the temperature of an object having a power source connected to an electrical transmitter whose frequency is controlled by a tank circuit and providing a temperature sensitive capacitor positioned adjacent the object and electrically connected to the tank circuit thereby varying the transmitted signal in proportion to the temperature of the object.

A still further object of the present invention is to provide an apparatus which measures a desired environmental or operating condition of moving objects such as rotating, oscillating, or reciprocating parts which apparatus generates an electrical supply power by the motion of the parts being measured and transmits electromagnetic waves of the information being measured.

A still further object of the present invention is to provide a telemetry measuring system for moving objects which utilize the motion of the moving object to generate an electrical supply power and which measures an environmental or operative condition such as temperature, stress, strain or pressure and transmits a signal proportional to the value of the condition being measured.

BRIEF DESCRIPTION OF THE DRAWINGS

In the attached drawings, like character references refer to like parts throughout the several views in which, FIG. 3 is an elevational view, partly schematic, illustrating a magnetic power generator for generating a voltage from rotary motion, FIG. 4 is an elevational view, partly schematic, illustrating a magnetic power generator for generating a voltage from oscillating motion, FIG. 5 is an elevational view, partly schematic, illustrating two other embodiments of magnetic power generators for creating a power source from oscillating motion, FIG. 6 is a cross-sectional view taken along the lines 6—6 of FIG. 5 and FIG. 7 is an electrical schematic of another embodiment of a temperature telemetry circuit.

By way of example only, and for purposes of illustration, the present invention will be described as used for measuring temperature of a piston in an internal combustion engine although it is to be understood that various other conditions can be measured and such measurements may be on other objects.

Figure 2:
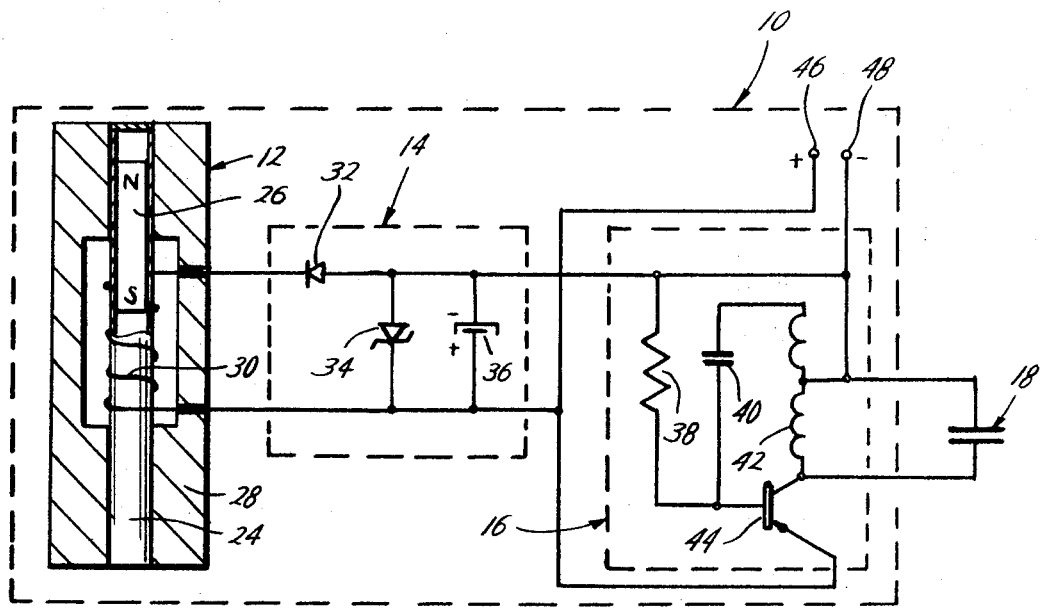
FIG. 2 is an electrical schematic of the apparatus of FIG. 1.

Referring now to the drawings, and particularly FIG. 2, the reference numeral 10 generally indicates the telemetry measuring apparatus of the present invention and generally includes a power generator 12, a rectifier circuit 14, a transmitter 16, and a sensing means 18.

The particular power generator 12 shown in FIG. 2 utilizes the reciprocating motion of the object being measured, such as an internal combustion engine piston 20 in the cylinder 22 (FIG. 1) to produce electrical supply power under environmental or service conditions where temperatures and shock load rule out the use of batteries or more conventional power sources. The power generator 12 basically is a magnetic generator to generate electrical power in response to the movement of the object to which it is connected such as by relative movement between a magnet and a magnetic core. The power generator 12, which is connected to the reciprocating piston 20, may include an elongate nonmagnetic tube 24 such as brass, stainless steel or a plastic having closed ends which may include resilient stops such as air pressure, or plastic discs or springs (not shown). In the tube 24 is positioned a magnet 26 which is free to move from end to end by the reciprocating motion of the piston 20 to which the generator is attached. A magnetic core 28 may be made of a suitable magnetic material and is positioned adjacent or surrounding the tube 24 to provide a low reluctance magnetic path between the ends of the tube 24. An electrical generating or pickup coil 30 surrounds a portion of the tube 24 for providing electrical power in response to relative movement of the magnet 26 to the coil 30. Thus, an electrical voltage is induced in the generating coil 30 as the flux lines of the moving magnet 26 pass the wires of the coil 30. Obviously, an electrical voltage would be generated if the generating components are reversed such as if the core 28 is made the magnet and the magnet 26 is made the core.

Thus the motion actuated power generator 12 can operate under extreme environmental conditions for long periods of time without resort to sliprings, flying leads or momentary contacts, all of which are plagued with mechanical problems and complexity.

The power generated in the power generator 12 may be rectified and filtered as desired. Thus, the rectifier 14 may include a rectifier diode 32, a zener regulator diode 34 and a filter capacitor 36. The power from the rectifier 14 is transmitted to the transmitter 16 and applied to the oscillator section whose frequency is controlled by the oscillator components, resistor 38, capacitor 40, tuning inductance 42, feedback inductance 43, and the variable capacitance of the sensor 18. The filtering action from the rectifier circuit 14 may be such that the DC power delivered to the transistor oscillator 44 is either steady or pulsating in synchronism with the motion of the power generator 12 thereby providing a characteristic modulation of the output that can be used to easily identify the radiation signal of the oscillator in the presence of noise or interfering signals.

In the event that it is desired to monitor the temperature of the skirt of the piston 20, a temperature sensitive capacitor, such as a ceramic capacitor, may be positioned on the skirt of the piston 20 and forms part of the tank circuit of the oscillator 44. Since the capacitance of the capacitor changes proportional to temperature, the sue of the capacitor 18 in the tank circuit of the oscillator 44 controls the oscillation frequency of the transmitter 16. Thus, the frequency variation of the transmitter 16 is proportional to the temperature variation of the piston 20.

The transmitter 16 is composed of transistor 44, bias resistor 38, feedback capacitor 40, tuning coil 42, tuning capacitance 18 and feedback inductance 43. Ordinarily oscillators of this type are operated as blocking oscillators in which the feedback from the feedback winding 43 is sufficient to make the base of transistor 44 draw large currents and rapidly charge capacitor 40 and stop transistor 44 from conducting. Capacitor 40 then discharges through resistor 38 until the transistor 44 conducts again and the process starts over again. In this ordinary blocking oscillator case, capacitor 18 is not used. A second oscillator of this type is the sinusoidal oscillator wherein the feedback from winding 43 is just sufficient to cause sinusoidal oscillation. In this sinusoidal oscillator, inductance 42 and capacitance 18 control the frequency whereas in the blocking oscillator in the values of resistor 38, capacitor 40 and the input resistance of the transistor 44 as an RC time constant control the number of pulses per second. In both the blocking oscillator and the sinusoidal oscillators the temperature characteristics of the transistors greatly influence the frequency of oscillation and the number of pulses per second.

The transmitter of this invention uses neither of these ordinary modes of oscillation but one in between. It was found that for an intermediate amount of feedback (between the high amount for the blocking oscillator and the low amount for the sinusoidal oscillator), the frequency of oscillation will be largely controlled by sensing capacitance 18 and that the frequency shifts caused by the capacitor 40 and the resistor 38 will be offset by the shifts caused by the changes in the characteristics of the transistor 44. Therefore, a temperature stable transmitter is obtained by adjusting the amount of feedback through inductor 43 and the values of resistor 38, input resistance of the transistor and the resistance of the coil 42 except for its strong frequency dependence upon the values of inductance 42 and capacitance 18. This intermediate operational point gives an output waveshape which is more pulse-shaped than sinusoidal.

Of course, other conditions such as pressure, strain and so forth may be measured by other types of transducer sensing means for the measurement of other environmental and operating conditions.

The radiated signals from the transmitter 16 may be received on conventional measuring equipment for measuring the frequency of the oscillator's output signal. In the event the telemetry measuring apparatus 10 is used in a metal block and crank case of an engine, which may effectively shield the radiation from the oscillator, a receiving antenna may be installed in the crank case of the engine and the leads brought out to the receiver.

Suitable external power connections 46 and 48 are provided to the transmitter 16 for testing purposes. In addition, the entire apparatus 10 may be encapsulated in an epoxy package for protection.

By way of example only, in one particular embodiment the various electrical components have the following values:

| | |
|---|---|
| Capacitor 36 | 70 microfarads |
| Resistor 38 | 100 Kiloohms |
| Capacitor 40 | 2200 picofarads |
| Inductance 42 | 200 microhenries |
| Inductance 43 | Adjustable in value |
| Capacitor 18 | 0.002 microfarads |

The above-named values provided an apparatus having a current drain of 750 microamperes at 3.0 volts DC with an output frequency of approximately 200 to 400 Kilocycles over a 100° F. to 300° F. temperature range.

While the telemetry measuring system has been described in connection with measuring the temperature of a piston, the present invention is capable of widely diversified uses such as providing a swallowable or implantable biological temperature sensor and transmitter by substituting a miniature battery for the power generator 12 and rectifier 14 for measuring small temperature changes, size and sensitivity to small temperature changes, such as 0.001° F. are important consideration.

Of course, various other types of power generators may be provided for converting motion into an electrical supply power. Referring now to FIG. 3 a power generator 19 is illustrated for providing a more steady supply voltage from a rotary moving object or for a reciprocating moving object driven by rotary motion. Thus, a rotating shaft 50 is rotating at a speed S and mounted on shaft 50 is the generator rotating element 21. The generating element 21 is composed of a U-shaped element composed of two soft iron pieces 53 and a permanent magnet 54 disposed therebetween. Around the two soft iron pieces 53 are wound the two generating or pickup coils 55 or 56 whose outputs are connecting in series aiding. As the rotary shaft 50 turns, a stator 51 comprising a circular disc having a plurality of alternate teeth 49 and spaces 51 directed inwardly towards the rotating element 20 is provided. As the shaft 50 turns the magnetic return path 57 is alternately short as shown and long when the shaft 50 has turned the width of one of a tooth 49. Thus, the output $e$ from the series connected coils 55 and 56 will be a pulsating voltage which has a number of pulses per second equal to the revolutions per second of shaft 50 times the number of teeth 49. In order to provide a timing or position indication for this system, a space or slot 52, placed at any convenient location, makes a different pulse at that point because the slot is smaller than the slots 59. The voltage $e$ from the coils 55 and 56 may then be transmitted to a suitable rectifier 14 and transmitter 16 and a sensing transducer 18, all mounted on the shaft 50, if it is desired to measure a physical condition of the shaft.

If a more nearly steady direct current is desired than produced by the generator 12 of FIG. 2 from a reciprocating object, then the generator 70 of FIG. 4 may be provided. Thus, the reciprocating motion of a connecting rod 67 is provided by connecting it to a shaft 66 which is off of the center 65 of a rotating wheel 60. A circular disc 61 having a plurality of outwardly directed teeth is provided fixedly secured about the shaft 66 to the wheel 60 so that it does not rotate relative to wheel 60. Then as wheel 60 rotates, the teeth on disc 61 will move relative to a U-shaped pickup 21 composed of two soft iron pieces 62 around which generating coils 64 and 65 are wound and which a permanent magnet 63 is provided therebetween. Thus, as the connecting rod 67 reciprocates the axis 66 rotates about the axis 65 causing the protruding teeth on the circular disc 61 to rotate past the pickup 21 and generate a voltage, $e$, in the coils 64 and 65.

Referring now to FIGS. 5 and 6 still further types of generators are shown for operation from a reciprocating connecting rod 67. Thus, a pickup 69 which includes a U-shaped piece of soft iron 71 with pickup coils 73 mounted thereon. The pickup 69 may be mounted on a piston 20 and a permanent magnet 72 is mounted on the connecting rod 67 so that it swings back and forth around the wrist pin and the magnet 72 swings in and out of the U-shaped piece 71 generating a voltage in the coils 73.

Still a further generator is shown in FIGS. 5 and 6 for providing a more nearly direct current from an oscillating or reciprocating member by providing a rotary generator 81 having a stator 85 and a rotor 86 similar in structure to FIG. 3 for generating a voltage as one moves relative to the other with the rotor 86 being connected to a shaft 82 having a bar 83 and a weight 84 attached to the end of the bar 83. Since every point on the connecting rod 67 goes into rotary motion, this motion will cause the weight 84 to go around the shaft 84 and rotate the rotor 86 of the generator to generate power.

Thus, the power generators of FIGS. 3, 4, 5 and 6 give many more than one pulsation per revolution of the shaft or one cycle of a piston. This means that more nearly steady direct current can be obtained from power generators of FIGS. 3—6 than the power generator of FIG. 2 where only two pulses are obtained for each cycle of the piston since the magnet moves when the acceleration is maximum upward and maximum downward. In any event, the size of the capacitor 36 in the rectifier circuit 14 is chosen such that the voltage fed to the transmitter is pulsating rather than smoothed to very small pulsations or direct current. This causes the voltage received signal to be amplitude modulated in synchronism with the motion of the piston for ease in identification and to assist in improving the signal/noise ratio. The diode 32 is thus required to limit the amplitude of the pulses so that the frequency of the oscillator 44 will be independent of the voltage on the peaks of the pulsations.

Referring now to FIG. 7, a further simplified embodiment of a temperature telemetering measuring apparatus is shown in which a conventional power supply 82 which is adjusted to have an output of waveform 84, that is, which output is composed of intermittent large amplitude, for example 3 to 10 volts, pulses of narrow width or very short duration. The output from power supply 82 is fed through diode 86 and inductor 88 which is coupled to a resonant circuit composed of inductor 90 and the temperature sensing capacitor 92. In this apparatus the resonant circuit, composed of inductor 90 and capacitor 92, is shock excited by the pulses from the power supply 82 through the inductor 88 and will oscillate. The shock excited oscillation will continue for a time after each pulse providing a signal having a waveform 94 which can be detected and received on an antenna of a receiver (not shown) and its oscillation frequency is a measure of temperature.

Figure 1:
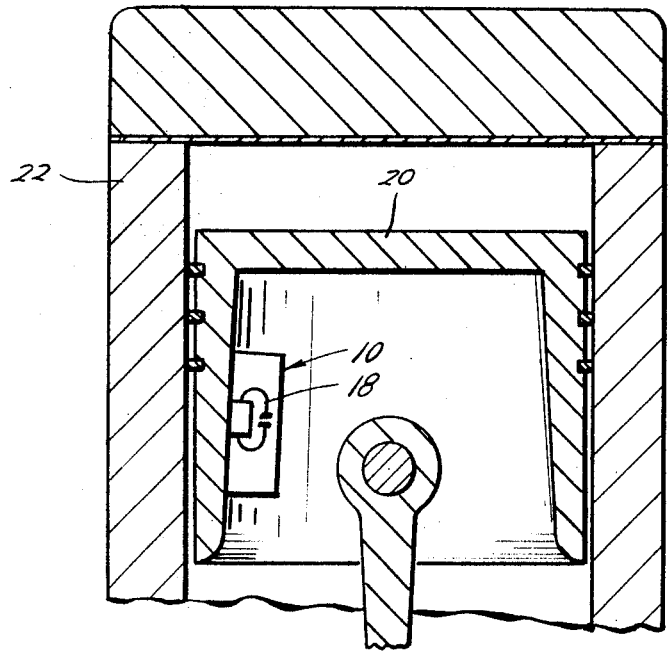
FIG. 1 is a fragmentary cross-sectional elevational view, partly schematic, illustrating the use of the present invention in connection with measuring the temperature of a piston in an internal combustion engine.

In use, the apparatus 10 is connected to the reciprocating part such as the piston 20 (FIG. 1). It is to be noted that the axis of the tube 24 (FIG. 2) is positioned and aligned with the direction of reciprocating motion of the piston 20 in order to induce movement of the magnet 26 relative to the coil 30. Thus, upon reciprocation of the piston 20 the magnet 26 will reciprocate in the tube 24 relative to the coil 30 thereby inducing an electrical AC voltage at the terminals of the coil 30. This voltage is transmitted to the rectifier circuit 14 where the supply voltage will be rectified by the diode 32, regulated by the zener diode 34, and filtered by the capacitor 36. The pulsating DC from the rectifier 14 is transmitted to the oscillator 16 to actuate the oscillator 44 to transmit electric-magnetic radiation waves. The ceramic capacitor 18, which may be encapsulated in the apparatus 10 or placed directly on the skirt of the piston 20, varies in capacitance in proportion to the temperature of its environment. Since the capacitor 18 is in the tank circuit of the oscillator the frequency of the signal output of transmitter 16 will vary in proportion to the temperature of the piston.

And, of course the generators 21, 70, 69 and 82 noted in FIGS. 3—6 or a battery may be substituted for the generator 12 of FIG. 2.

The present invention, therefore, is well adapted to carry out the objects and attain the ends and advantages mentioned as well as others inherent therein. While presently preferred embodiments of the invention are given for the purpose of disclosure, numerous changes in the details of construction, and arrangement of parts may be made which will readily suggest themselves to those skilled in the art and which are encompassed with the spirit of the invention and the scope of the appended claims.

What we claim is:

1. In combination with a repetitive moving apparatus of a telemetry measuring apparatus for measuring a property of the apparatus comprising:
a magnetic power generator means including a pickup coil, a magnet and a core movable relative to each other, one of which is secured to the moving apparatus thereby generating electrical power in the coil when the apparatus moves.
a rectifier connected to the coil for rectifying the generated electrical power,
an electrical transmitter connected to the rectifier for transmitting electrical signals, and
transducer sensing means measuring a property of the apparatus and electrically connected and varying the transmitter signal in proportion to variations in said measured property.

2. The apparatus of claim 1 wherein the generator includes, a nonmagnetic tube in which the magnet is movable and said coil is positioned about the tube,
a stop at each end of the tube thereby retaining said magnet in said tube, and
a magnetic core adjacent the tube providing a low reluctance magnetic path between the ends of the tube.

3. The apparatus of claim 1 wherein the transducer sensing means is a capacitor having a dielectric constant and a capacitance which varies proportional to temperature.

4. The apparatus of claim 3 wherein the transducer sensing means is a temperature sensitive ceramic capacitor.

5. A temperature telemetry apparatus for reciprocating machinery comprising,
a power generator means for connection to the reciprocating machinery and including,
an elongate nonmagnetic tube having closed ends,
a magnet movable in said tube in response to movement of the machinery,
an electrical coil surrounding a portion of the tube for generating electrical power in response to movement of the magnet relative to the coil,
a magnetic core, the ends of the tube to provide a low reluctance magnetic path between the ends of the tube;
a rectifier including a regulator and filter connected to the coil for receiving the power generated in the coil,
an electrical transmitter having a tank circuit for transmitting electrical signals whose frequency is controlled by the tank circuit, and
a temperature sensitive ceramic capacitor positioned adjacent the reciprocating machinery and electrically connected in the tank circuit thereby varying the transmitted signals in proportion to the temperature of the machinery.

6. The apparatus of claim 5 wherein,
said generator, rectifier and transmitter are encapsulated in an epoxy package.

7. In combination with a repetitive moving apparatus of a telemetry measuring apparatus for measuring a property of the apparatus comprising,
a magnetic power generator means having portions which when moved relative to each other generate a voltage, one portion being connected to the moving apparatus thereby generating a voltage when the apparatus moves,
a rectifier including a regulator and filter connected to the generator for receiving the generated voltage,
an electrical transmitter connected to the rectifier and having a tank circuit for transmitting electrical signals whose frequency is controlled by the tank circuit,
a temperature sensitive capacitor whose capacitance varies proportionally to temperature positioned adjacent the apparatus and electrically connected in the tank circuit thereby varying the transmitted signal in proportion to the temperature of the apparatus.

8. The apparatus of claim 7 wherein the power generator includes,
a first and second member, one of which is fixed and the other of which moves relative to the fixed member,
said first member being a circular toothed disc,
said second member including two soft iron pieces having the pickup coil wound thereon and a permanent magnet positioned between the soft iron pieces whereby a voltage is generated in the coil when the coil moves relative to the toothed disc, 9. The apparatus of claim 7 where the power generator includes,
a first and second member, one of which is connected to the moving apparatus and the other of which is fixed relative to the object,
said first member being a U-shaped soft iron piece having a pickup coil wound thereon, and
said second member being a permanent magnet movably positioned relative to the first member thereby generating a voltage in the coil when the apparatus moves.

10. The apparatus of claim 1 wherein the power generator includes,
a first and second member, one of which is fixed and the other of which moves relative to the fixed member,
said first member being a circular toothed disc,
said second member including two soft iron pieces having the pickup coil wound thereon and a permanent magnet positioned between the soft iron pieces whereby a voltage is generated in the coil when the coil moves relative to the toothed disc.